United States Patent [19]

Li et al.

[11] Patent Number: 5,506,697
[45] Date of Patent: Apr. 9, 1996

[54] APPARATUS FOR PROCESSING HUMAN-READABLE AND MACHINE-READABLE DOCUMENTS

[75] Inventors: Chung-Chi Li; Ynjiun P. Wang, both of Stonybrook, N.Y.

[73] Assignee: Symbol Technologies, Inc., Bohemia, N.Y.

[21] Appl. No.: 123,955

[22] Filed: Sep. 20, 1993

(Under 37 CFR 1.47)

Related U.S. Application Data

[63] Continuation-in-part of Ser. No. 461,881, Jan. 5, 1990, Pat. No. 5,304,786.
[51] Int. Cl.⁶ .................................................... H04N 1/40
[52] U.S. Cl. ...................... 358/448; 358/453; 358/462; 358/467; 235/462
[58] Field of Search .................................... 358/467, 470, 358/426, 443, 448, 474, 462, 452; 235/456, 462

[56] References Cited

U.S. PATENT DOCUMENTS 4,728,783  3/1988  Brass et al. .............................. 235/456
5,119,213  6/1992  Graves et al. ........................... 358/474

*Primary Examiner*—Scott A. Rogers

[57] ABSTRACT

An original document of one or more pages containing human-readable printed information is encoded in one or more two-dimensional bar code symbols and transmitted by facsimile to a remote site where a facsimile of the symbols is machine read, decoded and printed to provide an accurate reproduction of the original document. The facsimile symbol can be facsimile transmitted to another remote site where the facsimile symbol is regenerated, machine read, decoded and printed as another reproduction of the original document. The machine readability of the symbol facilitates computer entry of the original document printed information. The coded symbol may also contain data used at a remote site to control processing and dissemination of the original document printed information.

5 Claims, 9 Drawing Sheets

APPARATUS FOR PROCESSING HUMAN-READABLE AND MACHINE-READABLE DOCUMENTS

REFERENCE TO RELATED APPLICATIONS

The application is a continuation-in-part application of Ynjiun R. Wang et al., application Ser. No. 07/461,881, filed Jan. 5, 1990, now U.S. Pat. No. 5,304,786, and entitled "Non-Volatile Electro-Optical Read-Only Memory with High Density Dimensional Symbology." The disclosure of this application is incorporated herein by specific reference.

BACKGROUND OF THE INVENTION

1. Field of the Invention

The present invention generally relates to the processing of printed documents and, more particularly, systems and apparatus for creating, reproducing, dessiminating and storing the information content of documents in both image form and in encoded symbol form.

2. Description of the Prior Art

In current times, more and more emphasis is being placed on the dissemination of information. While a vast amount of data and information is disseminated by electronic networks, such as computer networks, the full information content of such communications does not leave a lasting impression on the recipient. Only printed information in hard copy form that can be read, studied, and readily saved for future reference, is truly capable of leaving a lasting impression. Unfortunately, the dissemination of printed material is cumbersome and slow as compared to the electronic transfer of information and data, and further, once information is in printed form it is difficult to return the information and data to electronic form. Certainly, printed material, such as documents, can be machine scanned or imaged for conversion to electronic data which then can be readily transferred. However, such conversion and transfer are time consuming, susceptible to error, and often result in loss of portions of the original data content.

One commonly used approach for representing information in a highly convenient machine readable form is to encode the information into a pattern of indicia having elements of different reflectivity, such as the ubiquitous UPC bar code symbol. The bar code symbol is optically scanned and the resulting signals are decoded into data representing the symbol encoding. This data can then be readily entered into and processed by a data processing system. Typical bar code symbols, such as the UPC symbol, are one-dimensional in character and thus are extremely limited in amount of data that can be encoded therein.

In the above-cited copending application, application Ser. No. 07/461,881, a two-dimensional bar code symbol is disclosed, which has high information density and capacity capabilities, as well as error detection and correction features. This symbol, known as the PDF417 symbol, is capable of representing as many as 500 characters per square inch of ASCII data. Thus, a relatively small number of PDF417 symbols, and in some cases a single PDF417 symbol, has the capacity to encode alphanumeric text filling a letter-size document.

SUMMARY OF THE INVENTION

The present invention is directed to the processing of documents containing humanly readable printed information and a machine readable symbol encoded to represent the printed information. The symbol is then scanned to enter the printed information contained in the document. The symbol is optically read to generate symbol data which is converted to document data by a computer. A printer, connected to the computer, prints out the document data to create a second document containing at least a portion of the printed information contained in the original document.

With entry into a computer, the printed information content of the original document can be readily processed before electronic transfer either by facsimile transmission or RF transmission to another computer. The printed information can also be reformatted or edited in the computer and then printed out to provide a revised document with or without a re-encoded symbol.

In accordance with another feature of the present invention, the information encoded in the printed symbol can include an identifier of the application program as well as an identifier of the specific template utilized to generate and/or modify the printed information content. When the symbol is scanned, decoded and entered into a computer, the identifier of the application program and the identifier of the template are utilized by the computer to initiate the appropriate application program and template in the computer to further modify the variable data of the printed information content.

To create a printed document bearing the encoded symbol, the original document text is machine read and encoded in symbol code format, and the symbol is printed on the original document or on a label adhered to the original document. The document can then be transmitted by a facsimile machine to another facsimile machine and printed out as a facsimile document. The symbol reproduced in the facsimile document is scanned and decoded to text data, which is printed out to produce a printed copy of the original document free of any image degradation occurring during facsimile transmission.

In accordance with another feature of the invention, rather than transmit the original document bearing the encoded symbol by facsimile, only the symbol is transmitted, in a significantly reduced time, to a facsimile receiver, where it is scanned and decoded to text data which is printed out to produce a hard copy duplicate of the original document.

When the original document includes multiple pages, each page is encoded in a symbol, and the multiple symbols are printed out on a consolidation sheet. The consolidation sheet is then transmitted to a receiving facsimile machine where the text data decoded from symbols in the facsimile transmission is printed out as hard copy duplicates of the original document pages. If each receiving facsimile machine regenerates the consolidation sheet received from a transmitting facsimile machine by decoding and re-encoding the consolidation sheet symbols while correcting for facsimile transmission degradation, image quality is maintained regardless of the number of facsimile transmissions.

Additional features and advantages of the present invention will be set forth in the description which follows and in part will be apparent from the description, or may be learned by practice of the invention. The objectives and other advantages of the invention will be realized and attained by the apparatus particularly pointed out in the detailed description and appended claims, as well as the accompanying drawings.

It is to be understood that both the foregoing general description and the following detailed description are intended to provide further explanation of the invention as claimed.

The accompanying drawings are included to provide further understanding of the invention and are incorporated in and constitute a part of the specification, illustrate several embodiments of the invention and together with the specification serve to explain the principles of the invention.

DETAILED DESCRIPTION OF PREFERRED EMBODIMENT

Figures 1, 2:
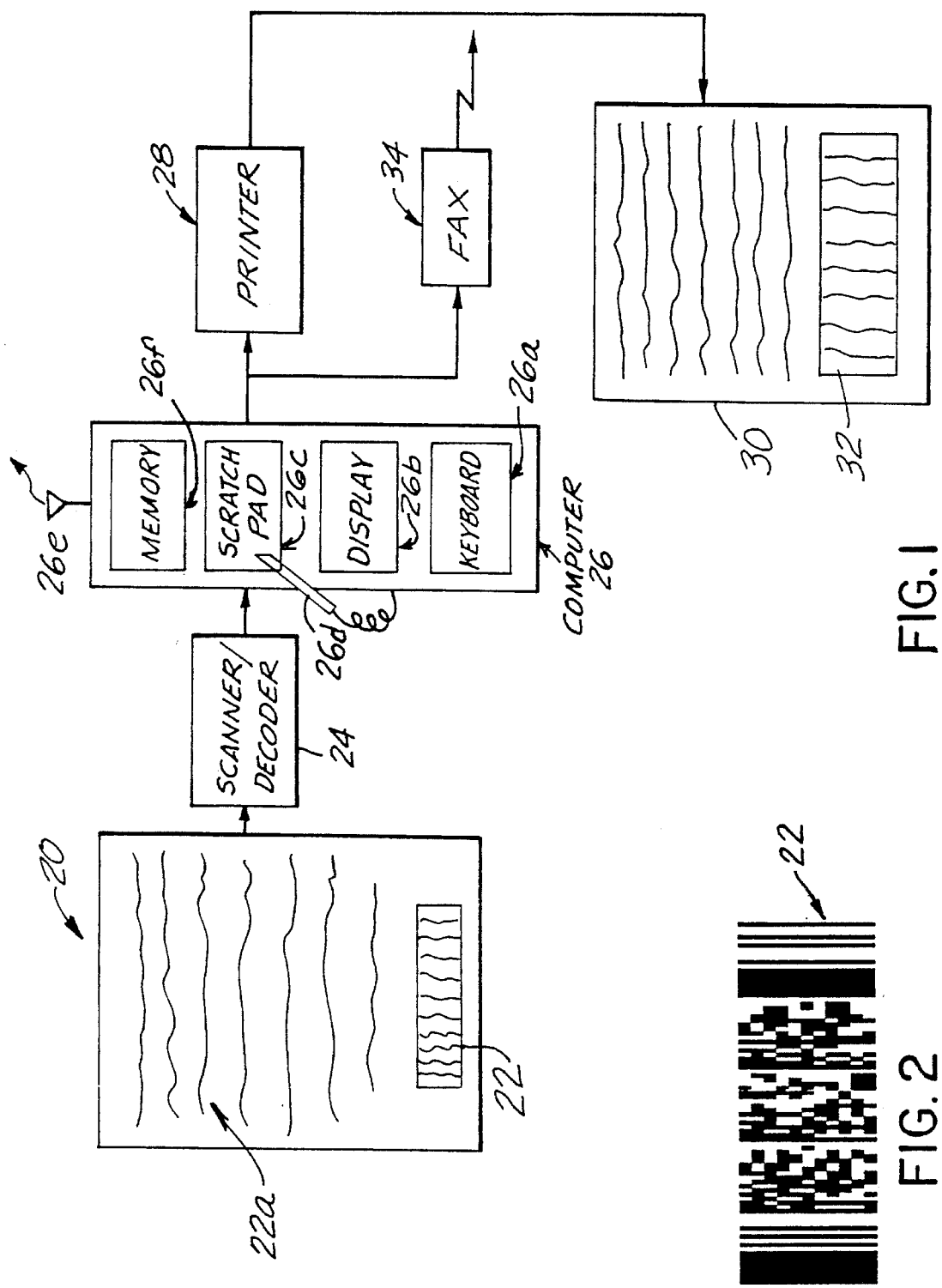
FIG. 1 is a block diagram illustrating apparatus constructed in accordance with one embodiment.
FIG. 2 is an illustration of an exemplary two-dimensional bar code symbol having utility in the present invention.

This invention is designed to create a virtual paper or dynamic document environment which avoids the problems of the prior art. In such an environment, humanly readable data on a document is encoded in a machine readable format which can be easily read by a machine, such as a computer, for editing and transmission to a remote site. By providing a document that is both machine-readable and human-readable, the document can be readily recreated and disseminated. FIG. 1 shows how a document containing encoded information may be used by computers. In FIG. 1, an original document 20 bears an encoded symbol 22 and typically, but not necessarily, printed information 22a. Symbol 22 is encoded with information relating to the entire printed information 22a on the document 20, or relating to at least a portion of the printed information 22a on the document 20. The encoded information in the symbol 22 may include information, such as, for example type font of the printed information 22a, format information, such as margin and tab settings, for the printed information 22a, as well as at least a portion of the printed information 22a itself. There are many known exchange protocols which may be used for representing the printed information 22a, such as, for example, Rich Text Format (RTF), which are known to those skilled in the art.

A symbol having sufficient information density and capacity to encode the information content of at least a portion of the printed information 22a is the PDF417 two-dimensional bar code symbol disclosed in the above-cited related application Ser. No.07/461,881. An example of this symbol is illustrated in FIG. 2. It should be noted that throughout this application, whenever a single symbol is shown, in the event the capacity requirements for storing the printed information 22a exceeds that of a single symbol, multiple symbols may be used. For example, PDF417 has a macro mode in which multiple PDF417 symbols can be utilized to store up to hundreds of thousands bytes of information. The macro mode is described in the PDF417 specification published by Symbol Technologies Inc.

The symbol 22 is read by a scanner/decoder 24 to enter the information encoded in the symbol 22 into a computer 26. Scanner/decoder 24 is preferably of the laser beam scanning type or CCD/CMD imaging type, such as disclosed in commonly assigned U.S. patent application Ser. No. 07/851,493, filed Mar. 16, 1992 and entitled "Method and Apparatus for Decoding two-dimensional Bar Code Using CCD/CMD Camera." A suitable laser beam scanner/decoder is disclosed in commonly assigned U.S. patent application Ser. No. 07/851,505, filed Mar. 16, 1992 and entitled "System for Encoding and Decoding Data in Machine Readable Graphic Form". The disclosures of these copending applications are specifically incorporated herein by reference. Scanner/decoder 24 thus includes a device to decode symbol 22 into a form that can read by computer 26. Scanning machine readable symbol 22 is better than scanning the printed information 22a because the data can be read into a computer more rapidly and accurately than an OCR (optical character reader) page scanner, for example. This is because symbol 22 can include error detection and correction capabilities, such as in the case of the PDF417 code.

Computer 26 may be a pen-based computer including a keyboard 26a, a display 26b and a scratch pad 26c for accepting handwritten entries using a pen 26d. Keyboard 26a and/or pen 26d are used to add, delete, rearrange or otherwise edit the printed information 20a of document 20, which is stored in computer memory 26f after the symbol 22 is scanned and decoded by the scanner/decoder 24. Display 26c is used to display the information content of the document as obtained by the scanner/decoder 24 from symbol 22 for viewing and editing.

Many known computer programs can be use for viewing and editing the information content of the document within the memory 26f of computer 26. In one illustrative embodiment, the symbol 22 is encoded to store the entire representation of the printed information 22a in Rich Text Format (RFT). The computer 26 is then arranged to utilize a standard word processing program, such as, for example, WordPerfect. The Rich Text Format (RTF) representation of the printed information 22a which is encoded in the symbol 22 is obtained and decoded by the scanner/decoder 24 and is provided to the memory 26f of the computer 26. As will be appreciated by one skilled in the art, the Wordperfect processing program can import the Rich Text Format (RTF) representation of the printed information 22a into the WordPerfect processing environment and various editing functions can be performed on the information content of the document 20. The resulting edited information content of the document can then be stored in the memory 26f of the computer 26. There are many other known formats, other than RTF, that can be utilized for representing the printed information 22a, such as, for example, ASCII format, Adobe Acrobat format, etc. . . .

Computer 26 can also be programmed to change the encoding of symbol 22 to reflect the editing performed on the information content of document 20. For example, after the editing is performed on the document in the WordPerfect environment, the resulting edited document can be stored in Rich Text Format (RTF) within the memory 26f. The computer 26 then encodes the contents of the Rich Text Format representation of the edited document into a new symbol which is stored in the memory 26f of the computer 26. The encodation of a PDF417 symbol is described in related application Ser. No.07/461,881, and need not be described further. Alternatively, it is possible to change the encoding of the symbol in real time fashion to reflect the editing performed on the information content of the document. For example, each time a key on the computer 26 is pressed during the editing process, an encodation routine is run to encode the data into the new symbol which is then stored in the memory 26f.

There are several mechanisms for obtaining the edited information from the memory 26f of computer 26. When called for, the edited document may be retrieved from computer memory 26f and printed out by printer 28 as an edited document 30, with or without an encoded symbol 32, where the encoded symbol 32 corresponds to the new symbol previously stored in the memory 26f, and therefore represents the information contents of the document as edited by the computer 26. Also, the edited document can be transmitted directly from the memory 26f of computer 26 by a facsimile machine 34 or a facsimile board (not shown) within computer 26. Alternatively, a facsimile transmission can be generated from document 30 by facsimile machine 34. Computer 26 may also be equipped with an RF communicator 26e to permit broadcasting of edited document 30 to remove receivers.

As can be appreciated, the symbol 32 of edited document 30 can now be scanned by the apparatus described with reference to FIG. 1 so as to permit subsequent editing of the information content of the document 30. In this manner, efficient exchange of information is effected, without loss of data content, between various apparatus as described with reference to FIG. 1.

Figure 9:
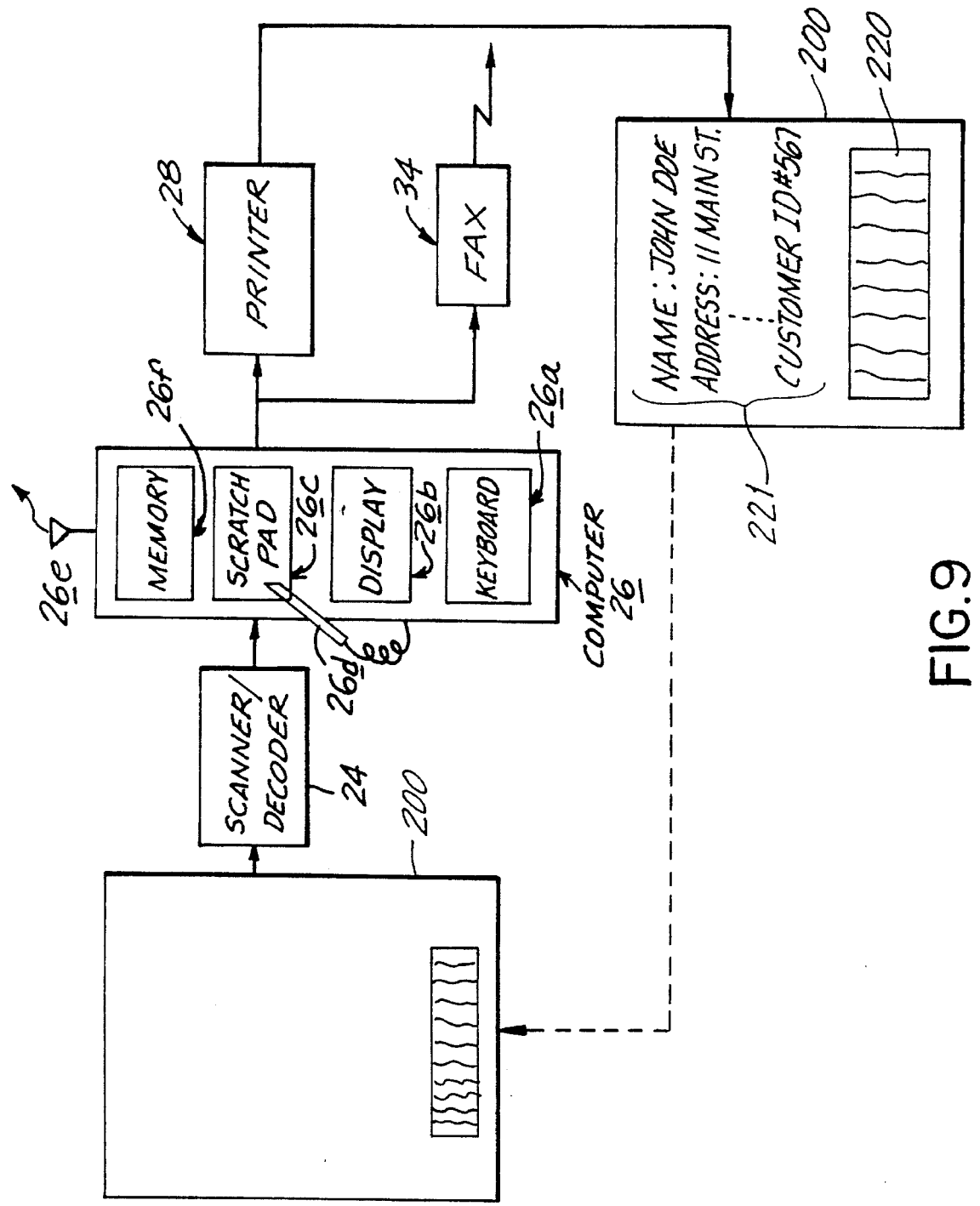
FIG. 9 is a diagram illustrating apparatus constructed in accordance with yet another embodiment of the present invention.
Figure 10:
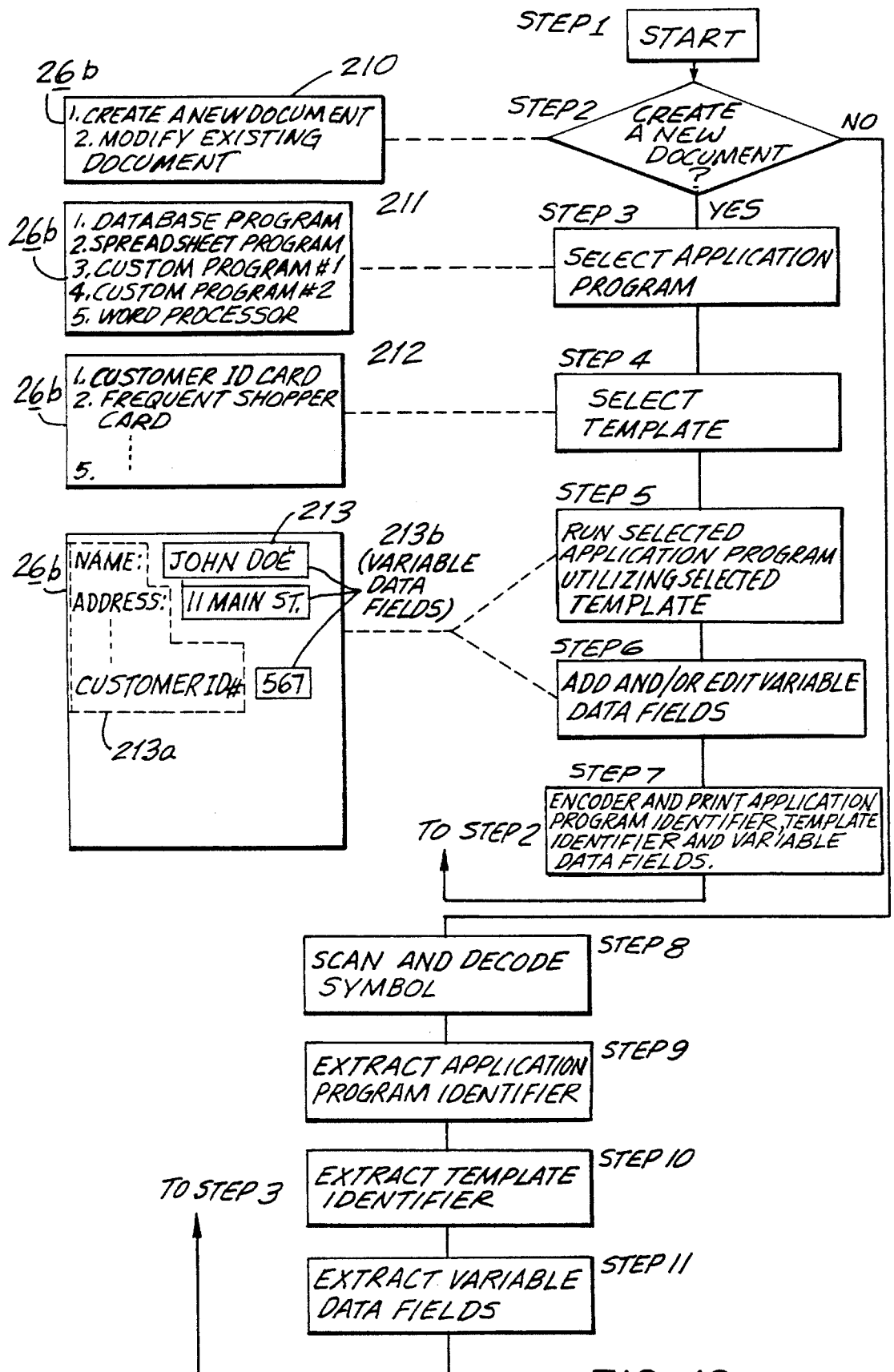
FIG. 10 is a flow chart illustrating the operation of the embodiment of FIG. 9.

A still further embodiment is now described with reference to FIGS. 9–10. In FIG. 9, elements which are the same as those described previous with reference to FIG. 1 are similarly numbered and therefore description thereof is omitted. In this embodiment, the computer 26 utilizes an application program, such as, for example, a database program such as MicroSoft Access, or a custom designed application program, to enter variable data which will then be printed onto document 200. As will be appreciated by those skilled in the art, such application programs have the capability of utilizing predefined templates for controlling the entry of the variable data. FIG. 10 is a flow-chart to illustrate this particular embodiment and includes representations of the display 26b of the computer 26 during various steps in the flowchart.

Referring now to the flowchart of FIG. 10:

Step 1: —START— A computer program residing in the memory 26f of the computer 26 is started.

Step 2: —CREATE A NEW DOCUMENT—The computer 26 displays on the display 26b a prompt 210 querying whether a new document is to be created or whether an existing document is to be modified. If a user selects creating a new document (e.g., entering a "1"), progress is made to Step 3.

Step 3: —SELECT APPLICATION PROGRAM— The computer 26 displays on the display 26b a prompt 211 querying which application program is to be utilized. In this example, the desired application program is selected by entering a number "1" through "5", each of which corresponds to a different application program. For this example, assume that a "1" is selected, and therefore, a database application, such as, for example, MicroSoft Access, is selected. While the remainder of this embodiment will illustrate a database application, as can be appreciated by one skilled in the art, many other types of application programs can be selected, such as, for example, a spreadsheet program, wordprocessing programs, as well as custom programs.

Step 4; —SELECT TEMPLATE— The computer 26 displays on the display 26b a prompt 212 querying which template is to be utilized. In this example, the desired template is selected by entering a number "1" through "5", each of which corresponds to a different template. It should be noted that different templates may exist for each application program described in Step 3, however, at this point only those templates associated with the selected application are displayed and available for selection. For this example, assume that a "1" is selected, and therefore, a Customer ID Card template is selected. While the remainder of this embodiment will illustrate a Customer ID Card template, as can be appreciated by one skilled in the art, a large number of varied templates may be configured for use by each application program.

Step 5+6: —RUN SELECTED APPLICATION PROGRAM UTILIZING SELECTED TEMPLATE—; —ADD AND/OR MODIFY VARIABLE DATA FIELDS— The computer initiates the selected application program and utilizes the selected template. Prompt 213 illustrates by way of example the display 26b of a database application program utilizing a Customer ID Card template. In this example, the template information 213a, which is fixed, describes the functions of each of the variable data fields 213b. The variable data fields 213b contain the information which can be entered and modified from the keyboard 26a of pen 26d. In this example, the variable date fields 213b contain information, such as, for example, the name of the customer, the address of the customer, and the customer ID#, etc.

Step 7: —ENCODE AND PRINT APPLICATION PROGRAM IDENTIFIER, TEMPLATE IDENTIFIER, AND VARIABLE DATA FIELDS— The computer 26 executes an encode routine, such as, for example, a PDF417 encoding routine, which encodes into a symbol: (i) an application program identifier which uniquely identifies the application program, (ii) a template identifier number which uniquely identifies the template utilized, and (iii) the variable data fields. By way of example, the application program identifier and the template identifier may each be an alpha-numeric character string. The encoded symbol is then printed by the printer 28 on a document 200 as symbol 220. The document 200 also includes human readable information 221 which is generated by the computer 26, where the human readable information includes the variable data fields, and may or may not include information obtained from the template as well as other information generated by the application program. After printing document 200, the application program is exited and progress is made to Step 2.

Step 8: This Step 8 is entered when the user elected at Step 2 to modify an existing document. Accordingly, referring to FIG. 9, the document 200 which was generated in Steps 3–7 is presented to the scanner/decoder 24. The scanner/decoder 24 scans and decodes symbol 220.

Step 9: The application program identifier contained in the decoded symbol 220 is stored in memory for subsequent use as a entry at Step 3.

Step 10: The template identifier contained in the decoded symbol 220 is stored in memory for subsequent use as an entry at Step 4.

Step 11: The variable date contained in the decoded symbol 220 is stored in memory for subsequent use as the variable data fields at Steps 5 and 6.

Progress is then made to Steps 3–6 which operate as previously described, except: (i) the selection of the application program at Step 3 is automatically performed by the computer 26 on the basis of the application program identifier stored in memory at Step 9, (ii) that the selection of the template at Step 4 is automatically performed by the computer 26 on the basis of the template identifier stored in memory at Step 10, and (iii) the variable data fields initially added at step 6 are automatically set by the computer 26 on the basis of the variable data fields stored in memory at Step 10.

Accordingly, as can be appreciated, document 200 carries all the information in symbol 220 to enable a computer 26, which contains corresponding application programs and templates to edit the variable data of the document, and then to print a new document 200 containing the edited information.

While the above embodiment utilized the same computer 26 for initially generating the document 200 and for subsequent scanning/decoding and modification of the document. However, as can be appreciated by those skilled in the art, a second computer having substantially the same function as computer 26 can be used for the subsequent scanning/decoding and modification of the document 200.

As can be appreciated, in accordance with the apparatus of FIGS. 9 and 10, very complicated documents 200 can be generated without requiring that the fixed information to be printed on the document be contained in the symbol 220. The symbol 220 merely is required to store the variable data fields, and the application and template identifiers, and is not required to carry any of the specific information relating to the fixed information printed on the document. For example, assuming that document 220 is a tax return document, where a majority of the information printed is fixed (e.g., dictated by the IRS). The only variable data fields are those required to be provided by the tax return filer. All the data relating to the fixed printed information is stored in the various application programs and templates contained within the computer 26.

Figure 3:
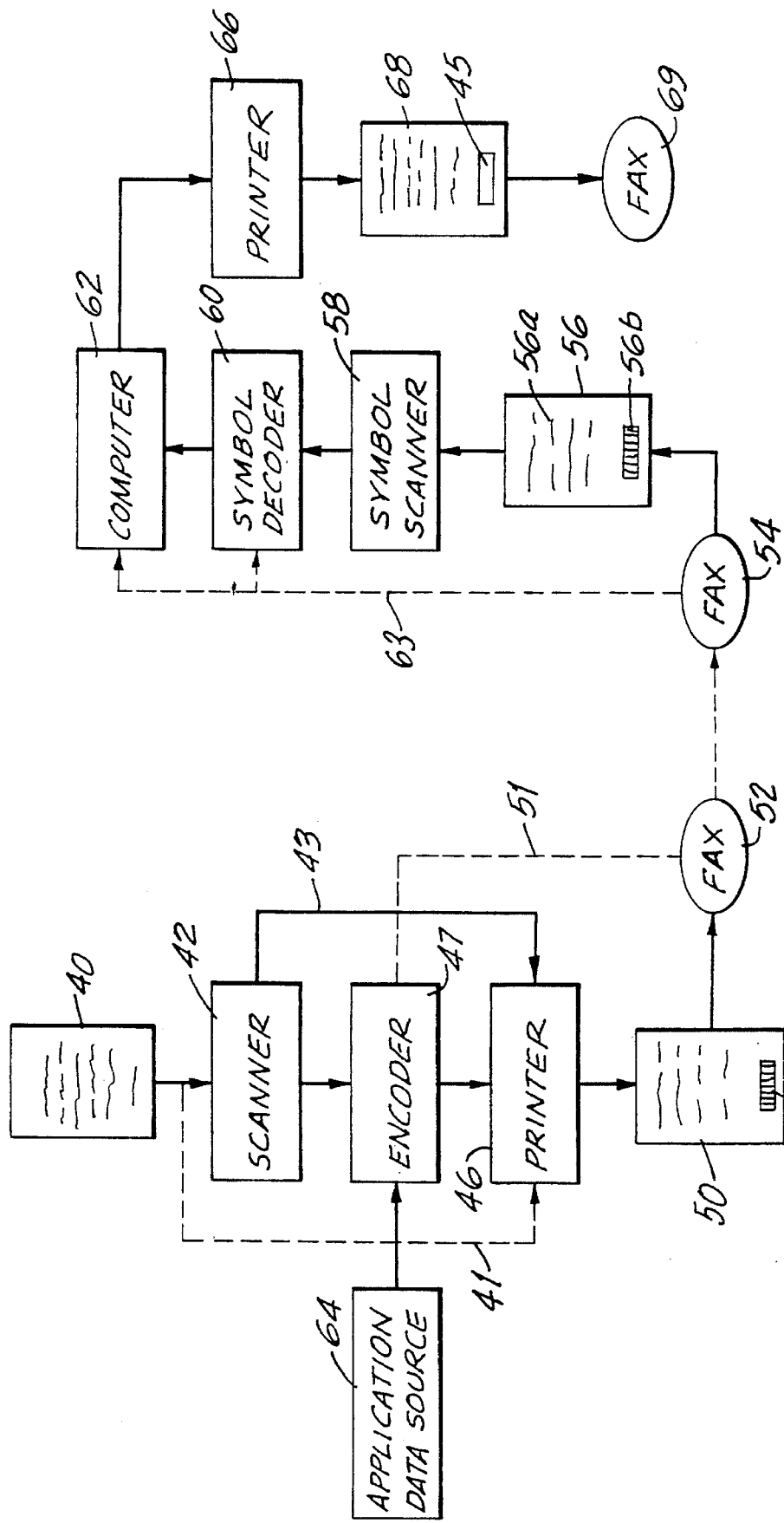
FIG. 3 is a block diagram illustrating apparatus constructed in accordance with an additional embodiment of the present invention.

FIG. 3 shows apparatus for generating and then transmitting a document with an encoded symbol in accordance with a further embodiment of the present invention. In FIG. 3, an original document 40, containing alphanumeric text 40a, is read by a page scanner 42. Encoder 44 converts alphanumeric text 40a into a highly compressed coded symbol 45. The format of symbol 45 is preferably the PDF417 format. The functions of scanner 42 and encoder 44 may be combined in a single scanner/encoder. A suitable scanner/encoder is disclosed in the above-cited copending application Ser. No. 07/851,505. The coded symbol 45 is then printed by a printer 46 on a document 50. Several approaches may be taken in the generation of document 50. First, printer 46 may simply print the coded symbol 45 onto a label (not shown) which is then adhered to a margin of original document 40 so as not to obscure text 40a. Alternatively, original document 40 may be fed through printer 46, as illustrated by phantom line 41, and coded symbol 45 is simply printed in one of the margins of the original document. Also, the scanner output data of the document text 40a may be supplied to printer 46 over line 43. In this case, the printer 46 reprints the text 40a in conjunction with coded symbol 45 on a clean document sheet. Document 50 thus represents either original document 40 bearing encoded symbol 45 or a reprint of the original document bearing coded symbol 45.

In addition, symbol 45 can be encoded by encoder 44 to also include application data generated by a source 64. This application data includes information that does not appear in the document text. Such application data may identify particular software used to generate the original document text, such as word processing software or spreadsheet software. In addition, symbol 45 may be encoded to include formulas used to calculate numerical information included in the original document text. Knowledge of such underlying document information can be quite beneficial to the recipient of the document and, unless encoded in symbol 45, is unavailable to the recipient. Other examples of beneficial underlying document information that can be included in coded symbol 45 will occur to those knowledgeable in the art.

The encoded symbol 45 may also include data for controlling dissemination of all or portions of the content of original document 40. For example, the symbol 45 may include control data specifying a limited number of facsimile transmissions of document 50, a time limit for such transmissions, a list of those authorized to receive such transmissions, or a limitation as to what portions of the original document can be transmitted. Transmitting facsimile machines, such as machine 52, would then include a decoder to extract this control data from the scanned symbol and be controlled accordingly. In an analogous application, a photocopier could be similarly equipped to extract the control data from a symbol being copied along with an original document. This control data would then be used to control the number of duplicate copies permitted, set copier parameters, set time limits, and so on.

Instead of creating document 50 containing text and symbol 45, encoder 44 may generate image data for symbol 45 for direct application to transmitting facsimile machine 52, as indicated by phantom line 51. This eliminates the need for printer 46 to print symbol 45 on document 50. Instead, original document 40 can simply be led through transmitting facsimile machine 52.

To transmit document 50 to a remote site, it is fed through a transmitting facsimile machine 52 for transmission to a receiving facsimile machine 54, which prints a facsimile document 56 of original document 50. This document contains human-readable alphanumeric text 56a from original document 50 and machine-readable facsimile symbol 56b from symbol 45 of document 50.

To use the data in facsimile document 56, facsimile symbol 56b is read by a scanner 58. The symbol code is converted back to alphanumeric code by a decoder 60 and entered into a computer 62. While scanner 58 and decoder 60 are illustrated as separate hardware components, it will be appreciated that they may be integrated into a single scanner/decoder component, such as scanner/decoder 24 in FIG. 1.

The human-readable text 56a can also be read by an OCR (optical character reader) page scanner (not shown) and entered into computer 62, but entry of the text via coded symbol 56b offers several important advantages. For example, facsimile text 56a may have been corrupted or otherwise degraded during transmission. Although it may still be readable, the text cannot be read accurately by an OCR page scanner. In such a case, the alphanumeric text will contain errors and thus not be identical to the original document text 40a. If coded symbol 45 includes correction capabilities to resolve transmission corruptions in the facsimile symbol image 56b, symbol reading errors can be corrected prior to computer entry of the document text.

Receiving facsimile machine 54 may also be programmed to send the symbol image facsimile data over line 63 for decoding by symbol decoder 60 or directly to the computer 62, if it is equipped with symbol decoding software. This eliminates the need for scanner 58. The receiving facsimile machine 54 may then print out facsimile 56 with or without symbol 56b, or provide no facsimile printout since the complete facsimile transmission is stored in computer memory.

The stored, decoded facsimile symbol, whether received directly from the receiving facsimile machine 54, from tile facsimile machine through decoder 60, or from the facsimile machine printer via symbol scanner 58 and decoder 60, may be recorded as a printout 68 by printer 66. Printout would be a duplicate of original document 40, with or without symbol 45 (or 56b). In this context, symbol 45 may be encoded with instructions to change the format in which the text appears in printout 68 from that appearing in original document 40. For example, such instructions, which would be introduced by application source 64, may also call for the computer to add standard text, graphics, or charts, to printout 48 that are not contained in the original document. Thus, text 40a of original document 40 may be variable information, and symbol 45 is encoded with this variable information together with instructions, entered by source 64. Computer 62 acts on these instructions to supplement the variable information with specified standard or fixed information computer 62 and then generates printout 68 containing both the variable and the standard information. As illustrated, computer printout document 68 may be facsimile transmitted to a remote site by facsimile machine 69 which may be a part of receiving facsimile machine 54.

Rather than alphanumeric encoding, symbol 45 may be encoded as a bit-mapped image of document 40, which is the technique utilized by standard facsimile machines to transmit a wide variety of documents regardless of content, e.g., pictures, graphs, drawings, etc. Thus, tile coded symbol can readily be transmitted and stored in computer memory in this bit-mapped encoded format, with or without a bit mapped image of the document content.

Figure 4:
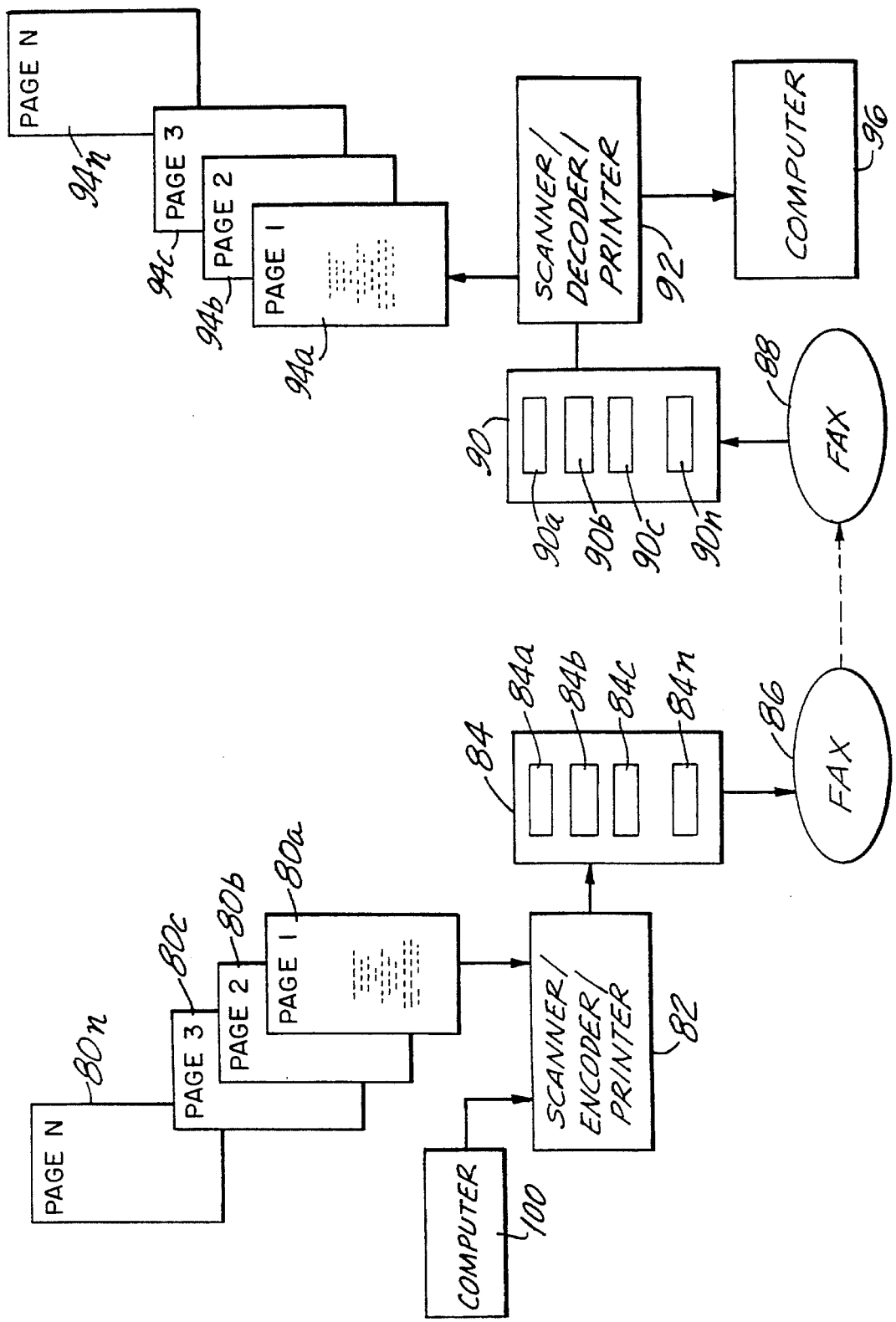
FIG. 4 is a block diagram illustrating apparatus constructed in accordance with another embodiment of the present invention.

FIG. 4 illustrates another embodiment of the invention which transmits several pages of a document to a remote site. Device 82 scans a plurality of original document pages 80a, 80b, 80c–80n, converts the document text on those pages to alphanumeric code, converts the alphanumeric code to a symbol code, such as PDF417 symbol code and prints the code on a consolidated sheet 84 as a corresponding succession of coded symbols 84a, 84b, 84c–84n. Each symbol includes an encoding of the text contained in a different one of the original document pages. Using the PDF417 two-dimensional bar code symbol, a significant number of such symbols, as many as eighty, can be printed on a single letter size consolidation sheet 84. If there are too many symbols to be printed on one consolidation sheet, additional sheets may be used.

Consolidation sheet 84 is then transmitted by a standard transmitting facsimile machine 86 to a standard receiving facsimile machine 88. The receiving facsimile machine 88 prints a facsimile consolidation sheet 90 containing symbols 90a, 90b, 90c–90n, which are facsimiles of coded symbols 84a, 84b, 84c–84n, respectively. Device 92 scans these symbols, decodes them and prints them as facsimile printouts 94a, 94b, 94c–94n, which are duplicates of documents 80a, 80b, 80c–80n, respectively. The alphanumeric code output device 92 may also be fed to a computer 96 having resident word processing software to allow editing. Document content can then be readily changed and printed out by printer device 92 to produce edited facsimile documents.

One advantage of the system in FIG. 4 is efficiency. By virtue of the data compression capabilities of the coded symbol, the time required to transmit consolidation sheet 84 from transmitting facsimile machine 86 to receiving facsimile machine 88 is dramatically less than the time required for a normal facsimile transmission of original documents 80a, 80b, 80c– 80n. Furthermore, due to the error correction capabilities of the symbol, facsimile documents 94a, 94b, 94c–94n do not suffer from the degradation and corruption of image quality typically associated with facsimile transmissions of document images.

Figure 5:
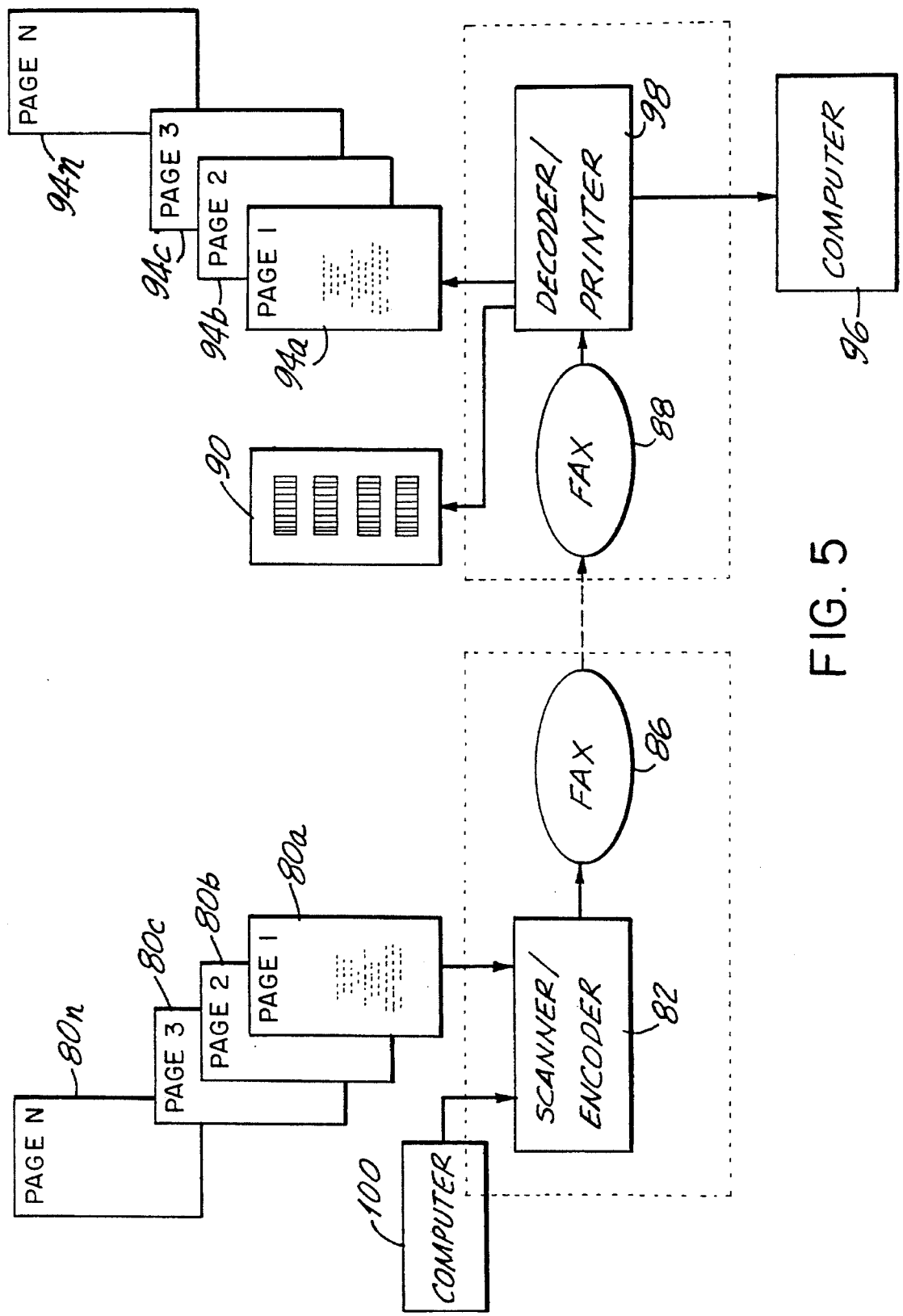
FIG. 5 is a block diagram illustrating apparatus constructed in accordance with yet another embodiment of the present invention.

FIG. 5 shows another embodiment of the invention which allows efficient and reliable transmission of documents to remote sites. As with the embodiment of the invention in FIG. 4, device 82 scans original documents 80a, 80b, 80c–80n and encodes them in a symbol format. Rather than printing out the coded symbols on a consolidation sheet as in the embodiment of FIG. 4, the device 82 sends the coded data directly to transmitting facsimile machine 86. Facsimile machine 86 then sends the images of the symbols as they would appear on a consolidated sheet to a receiving facsimile machine 88. Device 98 converts the transmitted facsimile symbol images directly to the alphanumeric text and prints facsimile printouts 94a, 94b, 94c–94n duplicating the original documents 80, 80b, 80c–80n, respectively. As in the embodiment of FIG. 4, the decoded output of device 98 may also be fed to a word processing computer 96, where the document content can be edited and then printed out by device 98.

The embodiment of FIG. 5 eliminates the need for a printer in device 82 and a symbol scanner in device 98, and thus this embodiment is less expensive to implement than the embodiment of FIG. 4.

Further, because the receiving facsimile machine 88 is directly connected to device 98, a facsimile consolidation sheet bearing the successive symbols need not be printed out. Device 98 may produce a consolidation sheet 90 for regenerative facsimile transmissions as will be seen below in the embodiment of FIG. 6.

In the embodiments of FIGS. 4 and 5, documents are scanned to convert their content to code. It will be understood, however, that documents can be created in electronic form by a general purpose computer, in which various application programs, such as word processing, database, spreadsheets, etc., are used to generate documents which are then stored as application files in computer memory. The contents of these application files are encoded in a predetermined format for such application programs or in one of the many industry standard file formats available. For example, a typical word processing program may also store predetermined character strings to indicate font type, font size, underlining, margins, page size, and other information, such as indications where pictures, figures and graphs should be inserted.

FIGS. 4 and 5 show a computer 100 containing the text of documents which it sends to device 82 to encode the contents into a two-dimensional bar code symbol. The symbol is then printed for standard facsimile transmission by transmitting facsimile machine 86, as in the embodiment of FIG. 4, or applied directly to the transmitting facsimile machine 86 for transmission, as in the embodiment of FIG. 5.

The symbols received by the receiving facsimile machine 88 are decoded by device 98 to recreate the application files.

Device 98 can also identify the type of application file and, based upon such identification, appropriately format and print documents 94a–94n as facsimiles of the symbol encoded application files. Further, by applying the decoded application file to word processing computer 96, the application files can be appropriately formatted for a particular application program.

Figure 6:
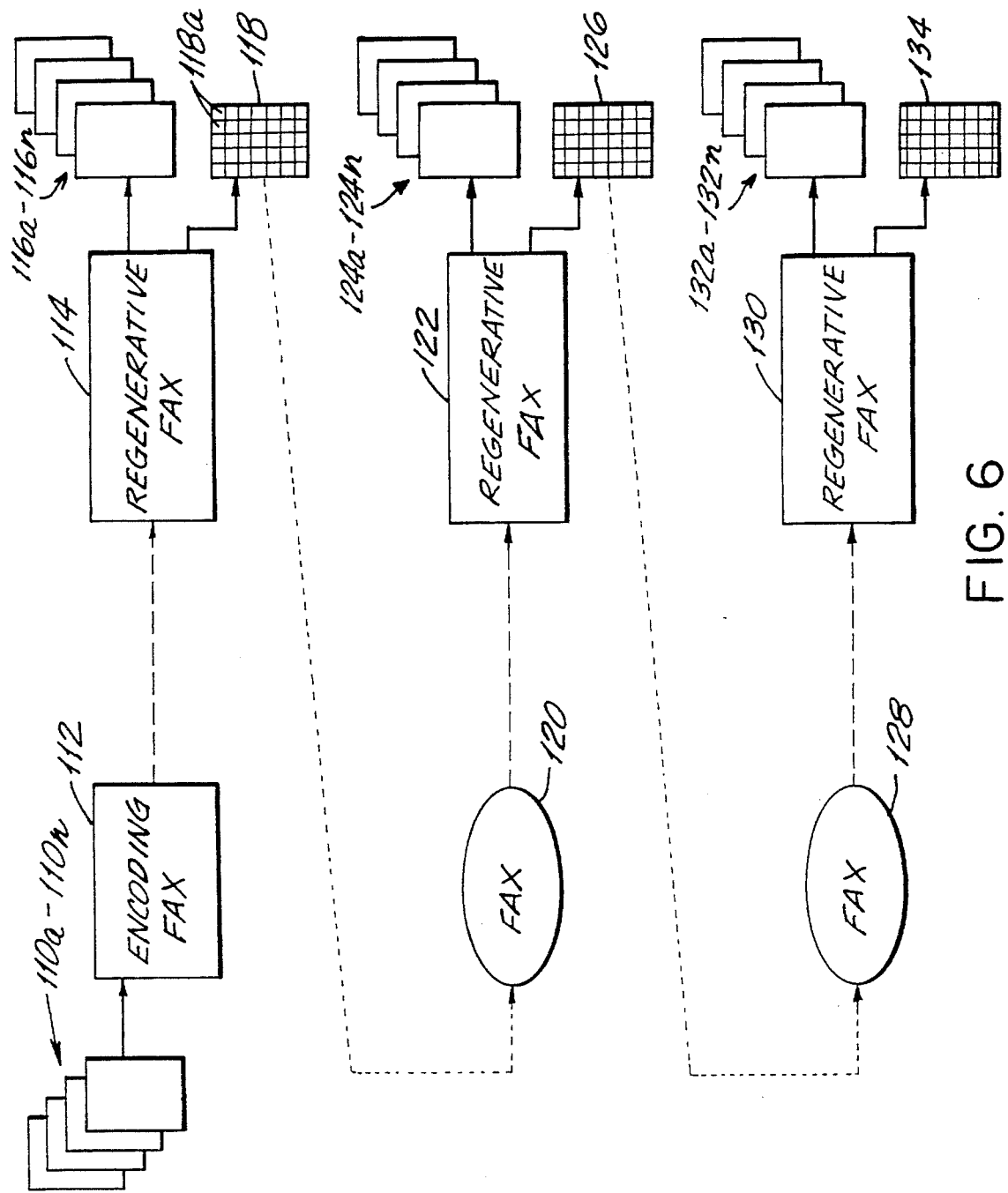
FIG. 6 is a block diagram illustrating apparatus constructed in accordance with a further embodiment of the present invention.

FIG. 6 shows the use of this invention in accurate transmittal and re-transmittal of documents. Document pages 110a–110n are fed in succession to an encoding facsimile machine 112. This machine includes a page scanner and a symbol encoder as does device 82 of FIG. 5. Symbols encoded with the contents of document pages 110a–110n are transmitted via facsimile to a regenerative facsimile machine 114. This machine decodes the received symbols and prints facsimile pages 116a–116n as hard copy duplicates of document pages 110a–110n. Regenerative facsimile machine 114 also prints out a consolidation sheet 118 bearing printed images, such as the ones indicated at 118a, of the encoded symbols transmitted by encoding facsimile machine 112.

Consolidation sheet 118 may then be fed through a standard facsimile machine 120 to transmit the consolidation sheet 118 to a second regenerative facsimile machine 122 which, like regenerative facsimile machine 114, prints out facsimile pages 124a–124n as duplicates of original document pages 110a–110n, respectively. In addition, regenerative facsimile machine 122 prints out the received symbols on another consolidation sheet 126 which is a duplicate of a consolidation sheet 118.

Consolidation sheet 126 can then be fed through a standard facsimile machine 128 and transmitted to a third regenerative facsimile machine 130 which prints out facsimile pages 132a–132n as duplicates of original document pages 110a–110n and prints out a consolidation sheet 134 of the received symbols again duplicating consolidation sheet 118.

This process of re-transmitting the consolidation sheet to regenerative facsimile machines which regenerates duplicates of the original documents and new consolidation sheets, can be continued indefinitely. Unlike conventional facsimile processing, the image quality of the duplicate pages does not decrease with added transmissions.

Figure 7:
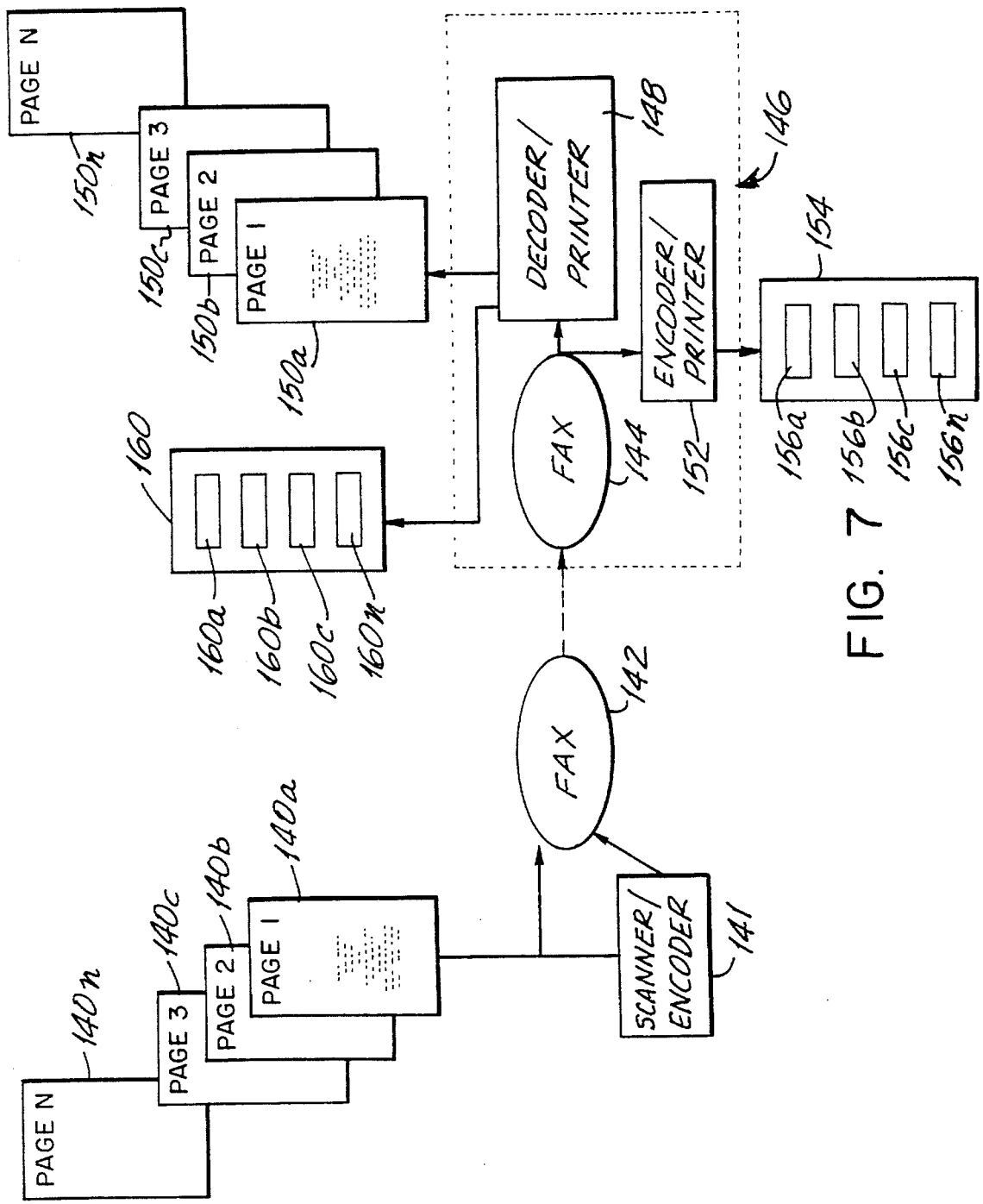
FIG. 7 is a block diagram illustrating apparatus constructed in accordance with yet another embodiment of the present invention.

FIG. 7 shows another embodiment of the invention in which the receiving facsimile system operates differently according to the transmitted information. Original document pages 140a–140n may be fed through a standard facsimile machine 142, and image data in bit-mapped format of the contents of these document pages are transmitted in succession to a standard receiving facsimile machine 144 included in a regenerative facsimile system 146. A discriminator (not shown) in facsimile machine 146 determines from the bit-mapped encoding that the facsimile transmission is a standard transmission of document images, and printer 148 prints hardcopy facsimile pages 150a–150n duplicating original document pages 140a–140n, respectively. In addition, the document image data is encoded into two-dimensional bar code symbols by an encoder 152. The encoded symbols 156a–156n are then printed out by printer 152 on a consolidation sheet 154.

The regenerative facsimile system 146 also has the capability of handling facsimile transmissions of encoded bar code symbols. Thus, if original document pages 140a–140n are fed through a scanner/encoder 141, such as in the embodiment of FIG. 5, document content is encoded in a succession of two-dimensional bar code symbols which are transmitted by standard facsimile machine 142 to standard facsimile machine 144 in regenerative facsimile system 146. When facsimile system 146 detects the reception of encoded symbols, printer 148 prints the symbols 160a–160n on a consolidation page 160. In addition, the received encoded symbols are decoded to document image data and printed out as facsimile pages 150a–150n, which are duplicates of document pages 140a–140n, respectively.

Figure 8:
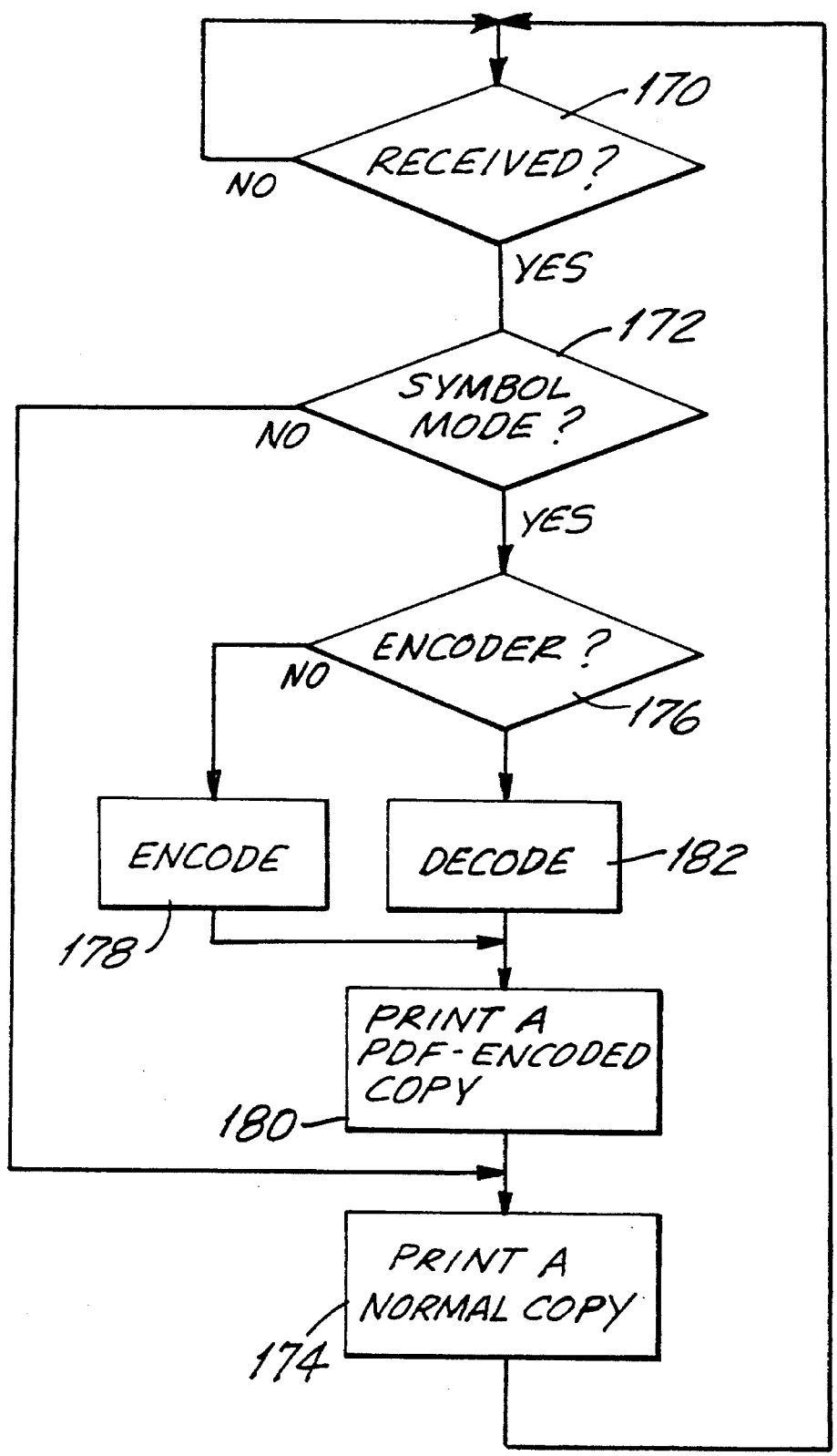
FIG. 8 is a flow chart illustrating the operation of the embodiment of FIG. 7.

The operation of the regenerative facsimile system 146, in FIG. 7, is also illustrated in the flowchart of FIG. 8. In step 170, the regenerative facsimile apparatus detects whether a facsimile transmission has been received. If yes, a determination is made (step 172) as to whether or not the regenerative facsimile system is set in an encoded symbol mode. If it is not, the apparatus functions in a standard facsimile receiving mode, and printer 148 prints out facsimile pages 150a–150n shown in FIG. 7 (step 174).

If, in step 172, the apparatus is determined to be set in the encoded symbol mode, a determination is made in step 176 as to whether or not the received facsimile transmission is that of a document image or an encoded symbol image. If the received transmission is of document images, encoder 152 (FIG. 7) encodes the document images in step 178 to generate encoded symbols. Printer 152 then prints the encoded bar code symbols in step 180 to create composite sheet 154 with bar code symbols 156a–156n printed thereon. In addition, printer 148 prints out the received document images as facsimile pages 150a–150n (step 174).

On the other hand, when the received facsimile transmissions are that of encoded symbols produced by scanner/encoder 141 in FIG. 7, they are decoded in step 182 of FIG. 8 and printed out by printer 148, as indicated at 160a–160n, on consolidation sheet 160 (step 180). In addition, the bar code symbol data, decoded by decoder 148 is printed out on facsimile pages 150a–150n as duplicates of original document pages 140a–140n (step 174).

From the foregoing description, it is seen that the regenerative facsimile apparatus 146, when operating in the encoded symbol mode, generates facsimiles of the original documents as well as separate facsimiles of the bar code symbol encoding of the original documents. Also, it will be appreciated that printers 148 and 152 may be one printer which is incorporated in facsimile machine 144.

It will be apparent to those skilled in the art that various modifications and variations can be made in the apparatus of the present invention without departing from the spirit or scope of the invention. Thus, it is intended that the present invention cover the modifications and variations of this invention provided they come within the scope of the appended claims and their equivalents.

We claim:

1. Apparatus for processing an original document containing both human-readable printed information and a machine-readable two-dimensional bar code symbol encoded with at least a portion of the human-readable printed information wherein said two-dimensional bar code symbol has a format which is error-correctable, said apparatus comprising, in combination:

optical scanning means for optically reading the two-dimensional bar code symbol to generate symbol data representative thereof;

a computer, connected to said reading means, for converting the symbol data to document data corresponding to said portion of said printed information;

an image reproduction unit, connected to said computer, for processing the document data to create a document image containing said portion of the printed information contained in the original document; and editing means to allow a user to modify said document image.

2. The apparatus of claim 1, which further includes:

an encoder for encoding printed information into a machine readable two-dimensional bar code system.

3. The apparatus of claim 2, which further includes:

means, connected to said encoder, for entering application data pertaining to the printed information and for sending the application data to the encoder, wherein the encoder encodes the application data in the symbol in conjunction with the printed information.

4. The apparatus defined in claim 1, wherein said image reproduction unit is a printer.

5. The apparatus of claims 1 or 4, wherein said apparatus further includes a facsimile machine for transmitting the document image to a remote location.

* * * * *